Dec. 19, 1933.   L. B. LARSEN   1,940,257
MOTION PICTURE PROJECTOR
Filed Nov. 14, 1922   3 Sheets-Sheet 1

Inventor
Louis B Larsen

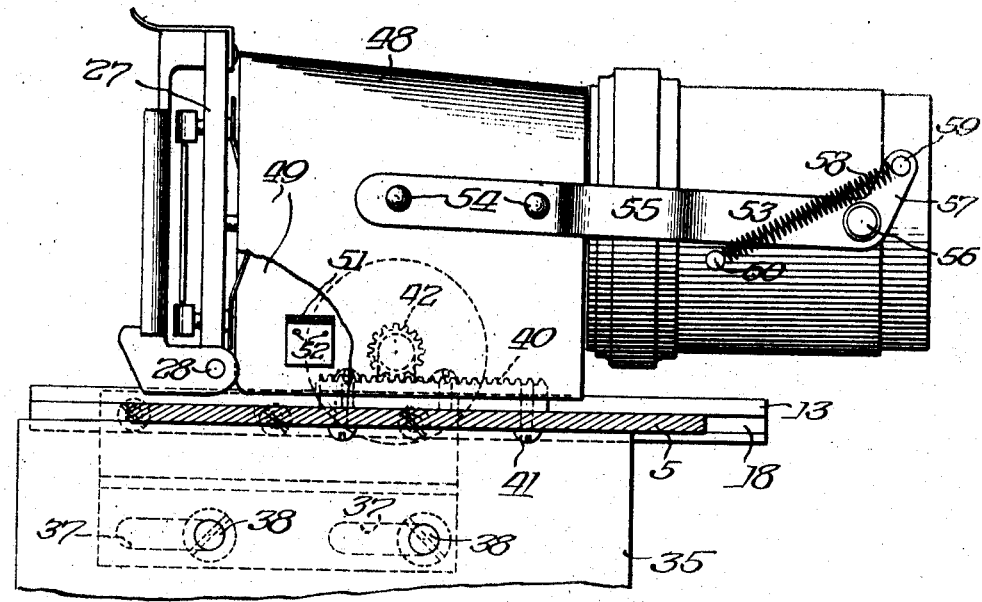

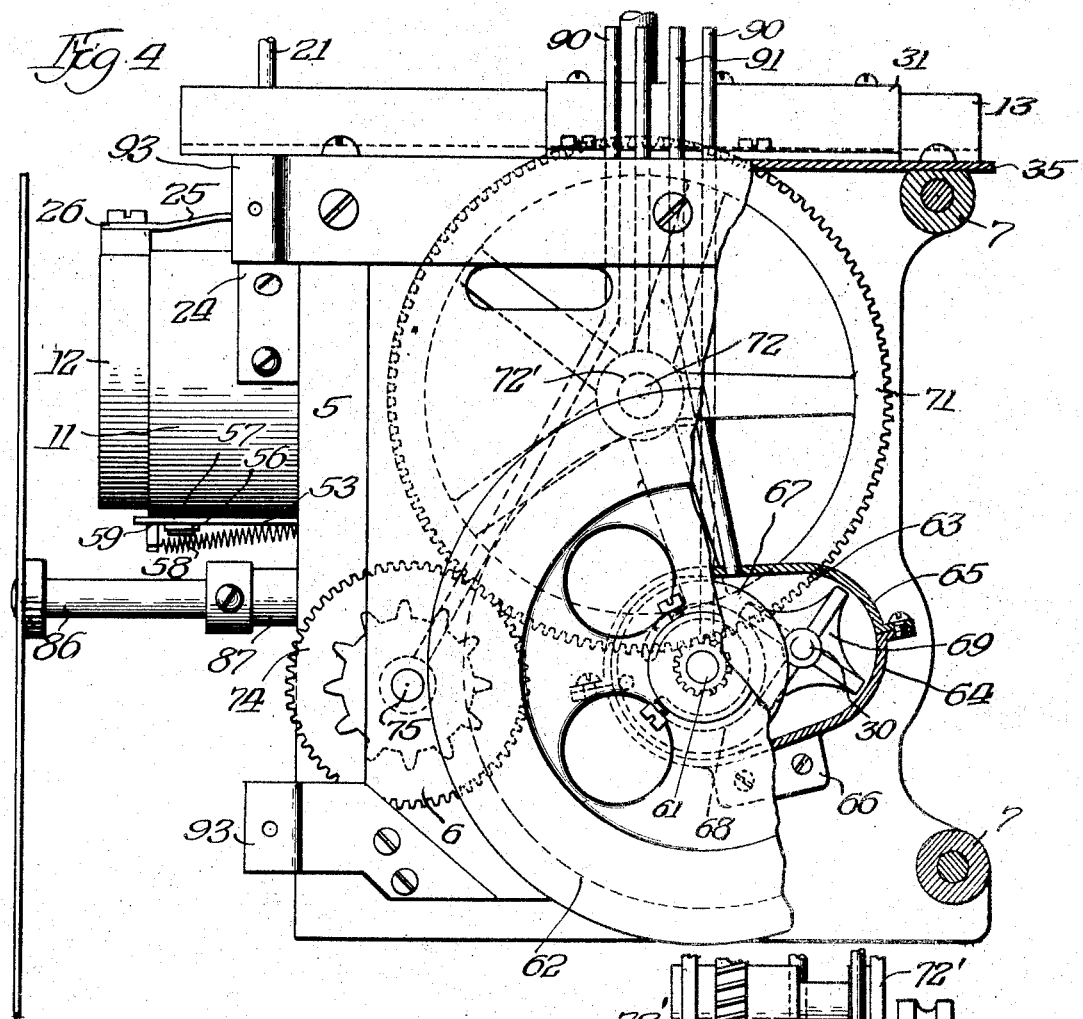
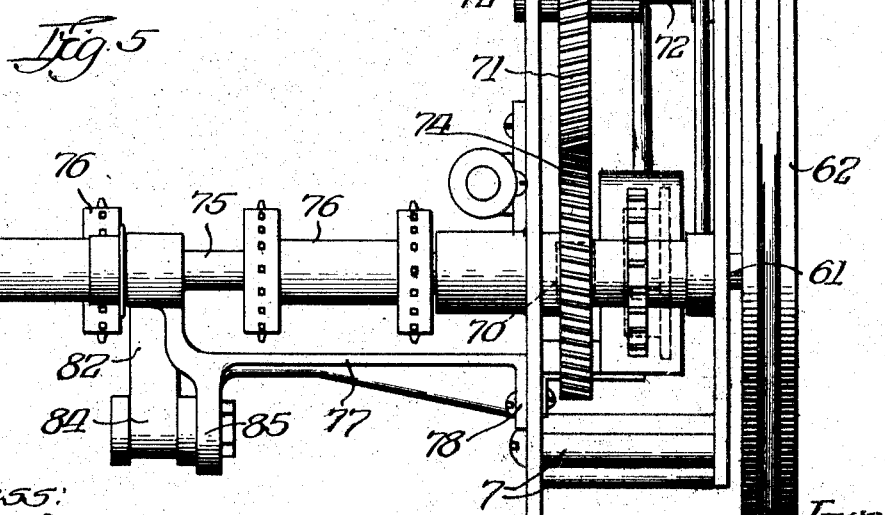

Patented Dec. 19, 1933

1,940,257

UNITED STATES PATENT OFFICE 1,940,257

MOTION PICTURE PROJECTOR

Louis B. Larsen, Chicago, Ill., assignor to Acme Motion Picture Projector Company, Chicago, Ill., a corporation of Illinois Application November 14, 1922
Serial No. 600,967

8 Claims. (Cl. 88—17)

This invention relates to apparatus for intermittently feeding a continuous web, and the improvements herein described are particularly directed toward motion picture projection devices.

The principal aim of this invention is to provide in a motion picture projection apparatus novel and improved means for adjusting the parts thereof for framing the picture; or, in other words, for bringing each successive picture into proper accurate relation to the opening through which the picture is to be projected; and the invention is characterized by the provision, in combination with mechanism for intermittently feeding the film, of means for adjusting the conventional film guide and objective relative to the feeding mechanism; the provision of a novel arrangement of the film guide and objective for bodily adjustment upon the support for the feeding mechanism; the provision of a novel unit construction of the film guide, objective, and carriage therefor to permit of ready removal as a unit from the support which carries the feeding mechanism; the provision of means for framing the picture which, in adjustment, does not disturb the fixed relation of the film guide and objective; and the general structural arrangement whereby a compact, strong and efficient mechanical organization is afforded for the purpose intended.

The invention is further characterized by the provision of an improved fire confining shield adapted for disposition adjacent to the axis of the film guide and objective and between them for preventing the spread of fire or explosion which may occur in operation; the provision of an improved construction of film feeding mechanism, whereby the same may be lightened in weight without sacrificing strength; the provision of an improved film feeding mechanism of unit construction to be mounted in the usual housing and serving as the support for the film guide and objective carriage, thereby affording a complete unit structure including the film feeding mechanism and framing adjustment ready for installation.

Among the specific distinctive features of the feeding mechanism is the improved mounting of the elements thereof in a suitable frame; the mounting of the intermittent gearing; the provision of lubricating means, and the improved construction of the film engaging feed drums or sprockets whereby their construction is lightened without sacrificing strength.

Other aims and distinctive advantages of the mechanical organization comprising the preferred embodiment of this invention will appear as this description proceeds, the accompanying drawings illustrating one manner of carrying out the aims of this invention.

In the drawings:

Figure 2 is a fragmentary bottom plan of the same;

Figure 3 is a fragmentary vertical section taken on the plane of line 3—3 of Figure 1, looking in the direction indicated by the arrows;

Figure 4 is a rear side elevational view, parts thereof being in section;

Figure 5 is a fragmentary end elevational view; and

Figure 6 is a sectional view of a detail.

Figure 1:
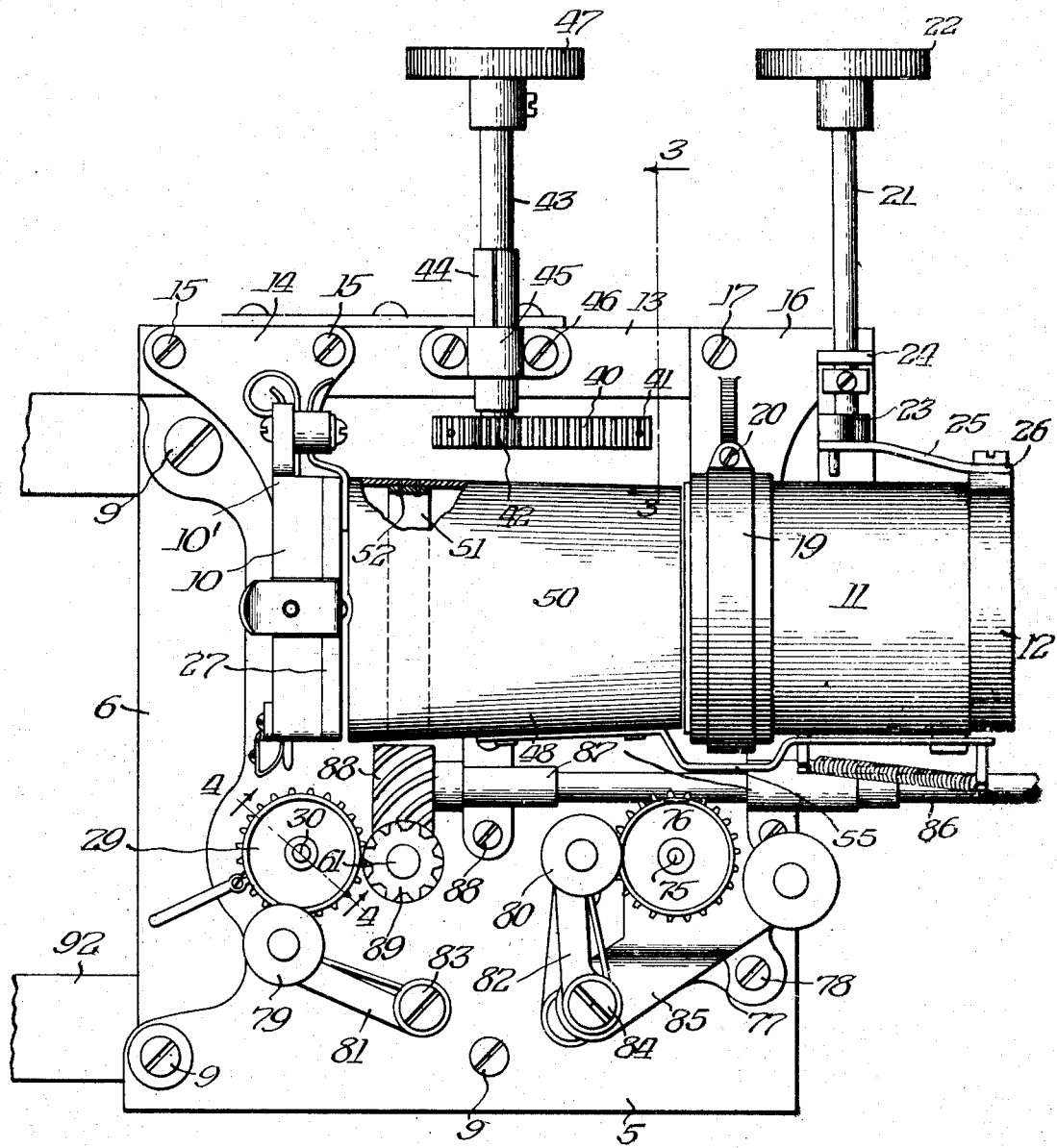
Figure 1 is a side elevational view of the device embodying this invention.

Referring more particularly to the picture framing feature of this invention and the improved shield, best shown in Figures 1 to 3, inclusive, 5 is the front plate of a frame and 6 is the rear plate of this frame, the said plates being connected in fixed spaced relation by laterally extending posts 7 on the plate 6, thereby affording a space or chamber 8 for receiving the film feeding mechanism to be described later. Screws 9 pass through properly alined openings in the plate 5 into the adjacent ends of the posts 7.

An apertured film guide 10 of a conventional type is provided, and an objective 11, having a slidably adjustable sleeve 12, is arranged with its optical axis in alignment with that of the film guide. The film guide 10 and objective 11 are detachably mounted in fixed spaced relation on a carriage 13, the film guide having a bracket 14 secured by screws 15—15 to a side of the carriage, and the objective 11 having a similar bracket 16 secured by screws 17 to the same side of the carriage.

The carriage 13 preferably takes the form of a bar substantially rectangular in cross-section and provided with a longitudinal groove 18 in its lower face for receiving the upper edge of the plate 5; the carriage is thus slidably mounted on the plate 5.

The bracket 16 which supports the objective 11 is provided with a divided circular portion 19 which embraces the objective 11 and is maintained in clamping engagement therewith by a screw 20. The portion 12 of the objective is movable relative to the objective and is actuated by a shaft 21 provided with a hand-wheel 22 and crank 23, said shaft being mounted in the bracket 24 secured to the objective, the crank 23 being connected by a link 25 with the outer portion 26 of the sleeve 12.

The film guide 10 is of the conventional form provided with a fixed portion 10', which is cast integrally with the bracket 14, and the portion 27 hinged at 28 to the guide. The hinge portion 27 may be opened to permit the introduction of the film and the latter is then engaged with a film feeding drum 29 fixedly mounted on the shaft 30, which shaft is connected to the film feeding mechanism to be described presently.

The carriage 13 is maintained in operative position on the plate 5 by a bracket 31, this bracket having a horizontal portion which engages with the upper surface of the carriage 13 by means of screws 32, the bracket having a downwardly extending portion 33 and a rearwardly extending horizontal portion 34. A plate 35 is secured between the plates 5 and 6 at the top of the supporting frame and is secured to the posts 7 by means of screws 36. The horizontal portion 34 of the bracket 31 is provided with a pair of aligned elongated openings 37 and a pair of screws 38 pass through the openings 37 and engage in suitably threaded openings in the plate 35. Washers 39 are interposed between the heads of the screws 38 and the upper surface of the portion 34 of the bracket 31 so as to prevent loosening of the screws and to take up wear.

It will be observed that the film guide and objective are carried by the carriage 13 in fixed spaced relation and that to properly frame the picture in the aperture, the latter, together with the objective, is moved relatively to the film feeding drum 29. In order to accomplish this movement of the carriage and the film guide, I provide a rack 40 secured by screws 41 to the front face of the plate 5, and this rack is adapted to be engaged by a pinion 42 carried by the lower end of a vertically extending shaft 43, which latter is mounted in a sleeve 44 suitably engaged and supported by a bracket 45 secured to the carriage 13 by means of screws 46. The upper end of the shaft 43 is provided with a handwheel 47 to permit manual operation of the said shaft. To frame the picture, the carriage is moved in either direction upon the plate 5 and thus moves the film guide 10 relative to the drum 29. In this manner the successive pictures on the film are moved up or down in the guide, as the case may be, for bringing each picture, as it is fed, into accurate registry with the opening in the film guide.

As previously pointed out, I have provided a shield for confining any fire or explosion to a point immediately adjacent the film guide and objective and to this end the shield preferably comprises a U-shaped body 48 having the spaced horizontal portions 49—49 and the vertical portion 50, this shield being of such width as to completely fill the space between the film guide and the objective, the shield being slightly tapered from the guide toward the objective so as to substantially accurately fit between the two. A brace 51 extends between the upper and lower portions 49 of the shield for strengthening the same, this brace being fixedly connected to said portions by means of rivets 52.

The shield is carried by an arm 53, said arm being riveted at 54 to the lower horizontal portion of the shield and provided with an off-set portion 55 adjacent the clamp 19, said arm 53 being pivoted at 56 on the under portion of the objective 11. The arm 53 is provided with a laterally extending portion 57, and a helical contractile spring 58 is connected at 59 to the free end of said arm 57 and anchored to a pin 60 secured to the objective. Thus the shield may be swung in and out of the position which it assumes between the film guide and the objective, the spring 58 tending to maintain the shield either in the closed or open position. The shield thus moves with the film guide and objective and may be swung into and out of closed position without disturbing the adjustment of the film guide or the relationship of the film guide and objective.

The film feeding mechanism previously referred to is mounted between the plates 5 and 6 and generally comprises a main drive shaft 61 on which a sheave 62 is fixedly mounted, this sheave being connected to a motor, not shown. A divided gear case 63 composed of the parts 64 and 65 is mounted in the space 8, the portion 64 being secured by means of a bracket 66 to the plate 5, this gear case containing a Geneva gear movement composed of the wheel 67 mounted on the shaft 61 and provided with the usual interrupted annular flange 68; and the star wheel 69 mounted on the shaft 30, adapted to be engaged and rotated intermittently by said wheel 67.

The shaft 61 extends transversely through the frame composed of the plates 5 and 6, and the gear case 63 is mounted in spaced relation to the plate 5 so as to accommodate a pinion 70 mounted on the shaft 61 between the gear case and said plate, this pinion meshing with the large gear 71 mounted on a shaft 72 carried in bearings 72' in said plates 5 and 6. The plate 35 is provided with a slot 73 to accommodate the periphery of the gear wheel 71. Said gear wheel 71 is in meshing engagement with a relatively small gear 74 mounted on a shaft 75 having bearings in the plates 5 and 6, said shaft extending beyond the plate 5 to receive the conventional film feeding drums 76, a bracket 77 secured at 78 to the front face of the plate 5 being extended parallel to the shaft 75 for suitably supporting the film feeding drums 76. As is customary, the drums 29 and 76 are provided with guiding rollers 79 and 80, respectively, carried by spring retained arms 81 and 82, respectively, the former arm being pivoted at 83 to the front face of the plate 5, and the latter arm being pivoted at 84 to a laterally extending part 85 of the bracket 77.

A shaft 86 is rotatably mounted in the bearing 87, secured by means of screws 88 to the front face of the plate 5, and this shaft serves to carry the rotatable shutter (not shown) which is commonly used in motion picture projection apparatus. The rear end of the shaft 86 is provided with a worm gear 88 which engages with a complementally formed gear 89 mounted on the forward projecting end of the main drive shaft 61 so that rotation of the shaft 61 is imparted to the shaft 86.

In order that the bearings of the film feeding mechanism located in the plate 6 may be lubricated, I provide a plurality of tubes 90—90, each one of these tubes leading to a bearing in the rear plate 6, one of the tubes, designated 91, leading to the gear case 63. These lubricating tubes may be connected to a suitable lubricating device, or a lubricant may be introduced through the upper ends of the tubes. The reason for placing these lubricating devices on the rear plate only is because the bearings there are usually not readily accessible, though the bearings in the front plate are sufficiently accessible to permit their being reached with an ordinary oil can spout.

The device when installed is placed as a unit in a suitable housing, a bar 92 at the upper edge and a pair of brackets at the lower edge of the plate 6 being provided with foot portions 93 suitably apertured to receive securing screws which go through said foot portions into the wall of the cabinet in which the device is mounted. Thus the mounting of the film feeding mechanism affords a compact, durable and efficient structure which is supported in its entirety as a unit in the housing or cabinet provided.

In Figure 6 I have shown an improved form of film feeding drum. Owing to the fact that these drums rotate at a high rate of speed, and that in the case of the drum 29 especially, the motion is intermittent, strength is required with lightness of construction, and therefore I have provided the shaft 30 with a transverse threaded opening 94, and a screw 95 which is adapted to pass through a suitable opening 96 in the tubular portion 97 of the drum, and into the threaded opening 94, the screw being of such length as to abut the tubular portion 96 at a diametrically opposite point. The tubular portion 96 is enlarged at either end as at 98—98, and these enlarged portions are provided with teeth 99—99 which engage in the perforations in the film.

Having thus described my invention and illustrated its use, what I claim as new and wish to secure by Letters Patent is—

1. In a motion picture projection apparatus, in combination, a film feeding mechanism, an apertured film guide and an objective in fixed spaced relation and adjustable relatively to said feeding mechanism along the axis of the objective, and a shield mounted between said guide and objective and movable therewith and relatively thereto.

2. In a motion picture projection apparatus, in combination, a film feeding mechanism, an apertured film guide and an objective in fixed spaced relation and adjustable relatively to said feeding mechanism along the axis of the objective, and a shield pivotally mounted upon said objective and adapted to swing between the film guide and objective.

3. In a motion picture projection apparatus, in combination, a supporting frame comprising spaced plates, film feeding mechanism supported upon and between said plates, and an apertured film guide and objective bodily movable upon one of said plates.

4. In a motion picture projection apparatus, in combination, a frame comprising spaced plates, a film guide and objective adjustably mounted on one of said plates, film engaging means outside of the plates, and driving means for said film engaging means arranged between said plates.

5. In a motion picture projection apparatus, in combination, a frame comprising spaced plates, a film guide and objective adjustably mounted on one of said plates, film feeding mechanism between said plates, and film engaging means driven by said film feeding mechanism, said frame, film guide, and film feeding mechanism forming a complete unit for installation.

6. In a motion picture projection apparatus, in combination, a frame comprising spaced plates, a film guide and objective adjustably mounted on one of said plates, film feeding mechanism including a main drive shaft mounted in bearings on said plates, and a rotary shutter shaft externally of said plates and driven by said main drive shaft.

7. In a motion picture projection apparatus, in combination, a frame comprising spaced plates, a main drive shaft mounted in bearings in said plates, reduction gearing connected to said main shaft, an intermittent gearing and a casing therefor mounted between said plates, and operatively connected with said main shaft, a film engaging drum externally of said plates and connected to said intermittent gearing, and a plurality of film feeding drums adapted to be continuously driven and connected with said reduction gearing.

8. In a motion picture projection apparatus, in combination, a frame comprising spaced plates, a main drive shaft mounted in bearings in said plates, reduction gearing connected to said main shaft, an intermittent gearing and a casing therefor mounted between said plates, and operatively connected with said main shaft, a film engaging drum externally of said plates and connected to said intermittent gearing, a rotary shutter shaft mounted on the external surface of one of said plates and operatively connected to said main drive shaft, and a group of film engaging drums operatively connected to and driven by said reduction gearing.

LOUIS B. LARSEN.